US012491208B2

(12) United States Patent
Takai et al.

(10) Patent No.: US 12,491,208 B2
(45) Date of Patent: Dec. 9, 2025

(54) COMBINATION AND METHOD FOR TREATING SUBJECT USING ALGINATE

(71) Applicants: MOCHIDA PHARMACEUTICAL CO., LTD., Tokyo (JP); NATIONAL UNIVERSITY CORPORATION HOKKAIDO UNIVERSITY, Sapporo (JP)

(72) Inventors: Tomokazu Takai, Tokyo (JP); Hitoshi Mizuno, Tokyo (JP); Akira Takahashi, Tokyo (JP); Toshiya Endo, Tokyo (JP); Shinichi Sakaue, Tokyo (JP); Norimasa Iwasaki, Hokkaido (JP); Tomohiro Onodera, Hokkaido (JP); Koji Iwasaki, Hokkaido (JP)

(73) Assignees: MOCHIDA PHARMACEUTICAL CO., LTD., Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 728 days.

(21) Appl. No.: 17/792,099

(22) PCT Filed: Jan. 13, 2021

(86) PCT No.: PCT/JP2021/000754
§ 371 (c)(1),
(2) Date: Jul. 11, 2022

(87) PCT Pub. No.: WO2021/145325
PCT Pub. Date: Jul. 22, 2021

(65) Prior Publication Data
US 2023/0045844 A1     Feb. 16, 2023

(30) Foreign Application Priority Data

Jan. 14, 2020   (JP) .................................. 2020-003614

(51) Int. Cl.
| | |
|---|---|
| *A61K 31/734* | (2006.01) |
| *A61K 9/06* | (2006.01) |
| *A61L 27/20* | (2006.01) |
| *A61L 27/52* | (2006.01) |
| *A61P 19/04* | (2006.01) |

(52) U.S. Cl.
CPC .............. *A61K 31/734* (2013.01); *A61K 9/06* (2013.01); *A61L 27/20* (2013.01); *A61L 27/52* (2013.01); *A61P 19/04* (2018.01)

(58) Field of Classification Search
CPC ......... A61K 31/734; A61K 9/06; A61P 19/04; A61L 27/20; A61L 27/52
USPC ......................................................... 514/54
See application file for complete search history.

(56) References Cited

U.S. PATENT DOCUMENTS

| | | | |
|---|---|---|---|
| 6,818,018 B1 | 11/2004 | Sawhney | |
| 7,009,034 B2 * | 3/2006 | Pathak | A61L 27/50 |
| | | | 530/382 |
| 2010/0015102 A1 | 1/2010 | Iwasaki et al. | |
| 2011/0142936 A1 | 6/2011 | Campbell et al. | |
| 2011/0293699 A1 | 12/2011 | Bennett et al. | |
| 2016/0166504 A1 | 6/2016 | Jarrett et al. | |
| 2020/0289547 A1 | 9/2020 | Sudo et al. | |
| 2021/0290432 A1 | 9/2021 | Baba et al. | |

FOREIGN PATENT DOCUMENTS

| | | |
|---|---|---|
| EP | 3 536 352 A1 | 9/2019 |
| JP | 2002-104996 A | 4/2002 |
| JP | 4740369 B2 | 8/2011 |
| JP | 2011-246714 A | 12/2011 |
| JP | 2013-514152 A | 4/2013 |
| JP | 3018152 * | 9/2017 |
| JP | 2017-537130 A | 12/2017 |
| JP | 6487110 B2 | 3/2019 |
| WO | WO 2008/102855 A1 | 8/2008 |
| WO | WO 2011/084465 A2 | 7/2011 |
| WO | WO 2016/094646 A1 | 6/2016 |
| WO | WO 2017/163603 A1 | 9/2017 |

(Continued)

OTHER PUBLICATIONS

English translation by machine for the foreign priority Japan 2020-003614, Apr. 2025 (Year: 2025).*
"Food Additives Revised Edition," edited by the Laboratory of Equipment Industry, Tianjin Institute of Light Industry, Beijing: China Light Industry Publishing Co., Ltd., Jul. 1985, p. 94 (4 pages total).
Chinese Office Action and Search Report for Chinese Application No. 202180008759.2, dated Oct. 10, 2023, with English translation.
Chinese Office Action for Chinese Application No. 202180008759. 2, dated Mar. 22, 2024, with English translation.

(Continued)

*Primary Examiner* — Yih-Horng Shiao
(74) *Attorney, Agent, or Firm* — Birch, Stewart, Kolasch & Birch, LLP

(57) ABSTRACT

Realized is reliable fixation of a material in a fluid state containing a monovalent metal salt of alginic acid when the material is applied to a subject. A combination of compositions comprising a first material composition containing a monovalent metal salt of alginic acid and a second material composition containing a cross-linking agent having an action of cross-linking the monovalent metal salt of alginic acid, wherein the combination is to be used in such a way as to apply the first material composition to a subject in a fluid state and contact the second material composition with the first material composition applied to the subject to gel at least a part of the first material composition, wherein the first material composition further contains a coloring component so that a formation state of a gel coat on a surface of the first material composition applied to the subject can be evaluated.

11 Claims, 2 Drawing Sheets

(56) References Cited

FOREIGN PATENT DOCUMENTS

WO     WO 2018/084306 A1     5/2018

OTHER PUBLICATIONS

Jiaojiang, "Food Additive Safety and Detection Technology," Harbin Institute of Technology Press, Aug. 2019, p. 77 (3 pages total).
Li, "Veterinary Basics and Disease Prevention and Control Revised Edition," Beijing: China Agriculture Press, May 1984, pp. 61-62 (4 pages total).
Nishioka, "Food Additives and Human Health," China Food Publishing House, Nov. 1989, p. 117 (3 pages total).
Qicai, "New Drug Handbook," Fuzhou-Fujian Science and Technology Press, Jan. 2001, p. 945 (3 pages total).
Report from China Patent Agent (H.K.) LTD for Chinese Application No. 202180008759.2, dated Apr. 10, 2024, 6 pages total, with English translation.
Xianwen, "Dictionary of Chemical Compounds," Shanghai: Shanghai Dictionary Publishers, Jun. 2002, p. 579 (4 pages total).
Extended European Search Report for European Application No. 21741903.5, dated Jan. 8, 2024.
Japanese Office Action for Japanese Application No. 2021-571198, dated Nov. 19, 2024, with English translation.

\* cited by examiner (a)  (b)  (c)

FIG. 2

| Amount of dye added | At the time of preparation | | 1 Week of storage | | 2 Weeks of storage | | 1 Month of storage | |
|---|---|---|---|---|---|---|---|---|
| | Lightness and chromaticity | Appearance | Lightness and chromaticity | Appearance | Lightness and chromaticity | Appearance | Lightness and chromaticity | Appearance |
| Blue No. 1 0.01% | $L^* = 47.49$ $a^* = -6.27$ $b^* = -55.49$ | 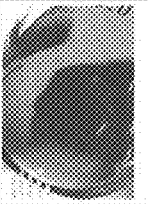 Precipitation: no | $L^* = 44.54$ $a^* = -5.38$ $b^* = -55.55$ | 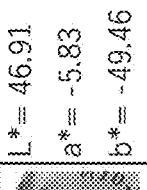 Precipitation: no | $L^* = 47.99$ $a^* = -8.26$ $b^* = -48.79$ |  Precipitation: no | $L^* = 46.91$ $a^* = -5.83$ $b^* = -49.46$ | 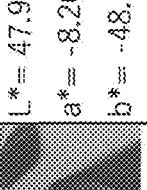 Precipitation: no |
| Blue No. 1 0.007% | $L^* = 57.41$ $a^* = -8.96$ $b^* = -40.30$ |  Precipitation: no | $L^* = 49.01$ $a^* = -13.42$ $b^* = -51.25$ | 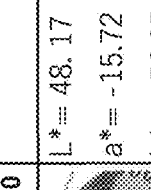 Precipitation: no | $L^* = 48.49$ $a^* = -13.75$ $b^* = -51.34$ |  Precipitation: no | $L^* = 48.17$ $a^* = -15.72$ $b^* = -56.25$ | 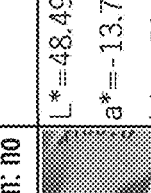 Precipitation: no |
| Blue No. 1 0.004% | $L^* = 61.06$ $a^* = -17.84$ $b^* = -33.82$ | 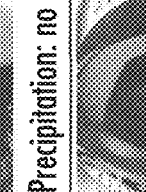 Precipitation: no | $L^* = 60.40$ $a^* = -17.24$ $b^* = -31.70$ | 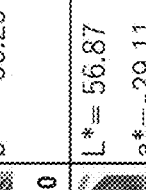 Precipitation: no | $L^* = 57.05$ $a^* = -23.20$ $b^* = -41.54$ |  Precipitation: no | $L^* = 56.87$ $a^* = -29.11$ $b^* = -49.70$ |  Precipitation: no |
| Blue No. 1 0.001% | $L^* = 74.98$ $a^* = -28.19$ $b^* = -22.44$ |  Precipitation: no | $L^* = 73.13$ $a^* = -29.06$ $b^* = -22.95$ | 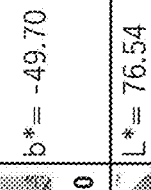 Precipitation: no | $L^* = 73.19$ $a^* = -28.71$ $b^* = -22.87$ |  Precipitation: no | $L^* = 76.54$ $a^* = -33.65$ $b^* = -26.08$ | 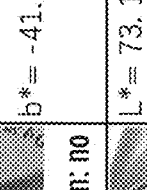 Precipitation: no |

COMBINATION AND METHOD FOR TREATING SUBJECT USING ALGINATE

TECHNICAL FIELD

The present invention relates to a technique for treatment of a subject using a monovalent metal salt of alginic acid, which is useful for cartilage regeneration and the like.

BACKGROUND ART

Articular cartilage of the knee or the like lacks vascular and neural networks and thus has virtually no potential for self-repair, and thus if a cartilage defect is left untreated, it can lead to joint pain or loss of joint function, and this can often progress to osteoarthritis. In addition, the progression of the medical condition from an early stage of osteoarthritis at which the surface of articular cartilage begins to wear because of aging and overuse of the joint can result in a cartilage defect in a broad region.

As a method for treatment of cartilage injury, a surgical treatment such as osteochondral autograft transplantation (mosaicplasty), a method for perforation using a pick (microfracture method), drilling, a method for abrading subchondral bone using a bar (abrasion method), or resection of injured cartilage (debridement) is known. Of these, the microfracture method, drilling, and the abrasion method are each referred to as a bone marrow stimulation technique, and promote bleeding from the bone marrow to induce a bone marrow-derived cartilage progenitor cell in anticipation of differentiation thereof into cartilage. However, a problem of the bone marrow stimulation technique is that fibrocartilage having a different mechanical property from that of the original hyaline cartilage is formed.

Meanwhile, a material in which a monovalent metal salt of alginic acid is dissolved to be in a fluid state is applied to a defect portion of cartilage tissue, a cross-linking agent is added for fixation to gel the material, the material is left to stand for a certain period of time, and thereby the formation of hyaline cartilage is promoted, and it is known that the material is useful as a composition for cartilage regeneration (Patent Literature 1). In addition, regarding intervertebral disc tissue, it has been shown that the regeneration of a nucleus pulposus of an intervertebral disc is promoted by filling a cavity after removal (resection) of the nucleus pulposus of the intervertebral disc with a monovalent metal salt of alginic acid as a material for filling a nucleus pulposus (Patent Literature 2). Further, a local hemostatic composition containing a component having a hemostatic action and a dye applicable to the human body is disclosed, and it is disclosed that examples of the component having a hemostatic action include thrombin, sodium alginate, and a vasoconstrictor and that examples of the dye include Blue No. 1. However, no specific examples of actual use of sodium alginate are disclosed (Patent Literature 3).

CITATION LIST

Patent Literature

Patent Literature 1: Japanese Patent No. 4740369
Patent Literature 2: Japanese Patent No. 6487110
Patent Literature 3: Japanese Patent Laid-Open No. 2002-104996

SUMMARY OF INVENTION

Technical Problem

The present inventors have recognized that there are some aspects that are difficult to confirm when using a monovalent metal salt of alginic acid, such as whether or not the salt has been applied to a desired point, and whether or not gelation by a cross-linking agent is sufficient, and whether or not a once gelled portion is damaged. That is, especially in, for example, an arthroscopic procedure, the user has to take measures such as using an excessive amount of a material including a monovalent metal salt of alginic acid or a material for gelation thereof because of the uncertainty of fixation, or washing using a sufficient amount of physiological saline or the like after the application of such a material. However, it is desirable for the material thus applied to be prevented from spreading to the surrounding area other than the target point as much as possible. In addition, it is also desired to save labor in the washing work.

In view of the above problems, an object of the present invention is to realize reliable fixation of a material in a fluid state containing a monovalent metal salt of alginic acid when the material is applied to a subject.

In addition, another object of the present invention is to provide a composition that contains a coloring component and a monovalent metal salt of alginic acid and does not cause precipitation of the coloring component even when stored at a low temperature of about 2 to 8° C. for a certain period of time (for example, one month), that is, can be stably stored.

Solution to Problem

That is, the present invention is as follows.

[0] Combining of compositions comprising a first agent (material) composition containing a monovalent metal salt of alginic acid and a second agent (material) composition containing a cross-linking agent having an action of cross-linking the monovalent metal salt of alginic acid, wherein the combining is to be used in such a way as to apply the first agent (material) composition to a subject in a fluid state and contact the second agent (material) composition with the first agent (material) composition applied to the subject to gel at least a part of the first agent (material) composition, wherein the first agent (material) composition further contains a coloring component so that a formation state of a gel coat on a surface of the first agent (material) composition applied to the subject can be evaluated.

[1] A combination of compositions comprising a first agent (material) composition containing a monovalent metal salt of alginic acid and a second agent (material) composition containing a cross-linking agent having an action of cross-linking the monovalent metal salt of alginic acid, wherein the combination is to be used in such a way as to apply the first agent (material) composition to a subject in a fluid state and contact the second agent (material) composition with the first agent (material) composition applied to the subject to gel at least a part of the first agent (material) composition, wherein the first agent (material) composition further contains a coloring component so that a formation state of a gel coat on a surface of the first agent (material) composition applied to the subject can be evaluated.

[2] The combination according to above [1], wherein the evaluation of the formation state of the gel coat is an evaluation of the presence or absence of outflow of the composition in a fluid state of the first agent (material) composition applied to the subject.

[3] The combination according to above [1] or [2], wherein the evaluation of the formation state of the gel coat is carried out (1) after washing of a surface of the gel coat of the first agent (material) composition applied to the subject and/or (2) after pressurization of the surface of the gel coat of the first agent (material) composition applied to the subject.

[4] The combination according to above [3], wherein the pressurization of the surface of the gel coat is carried out by contacting a device with the surface of the gel coat.

[5] The combination according to any one of above [1] to [4], wherein the subject is at least one selected from the group consisting of bone tissue, cartilage tissue, osteochondral tissue, intervertebral disc tissue, meniscal tissue, and a ligament.

[6] The combination according to any one of above [1] to [5], wherein the first material composition contains a blue to green dye that can be applied to a biological body as the coloring component.

[7] The combination according to any one of above [1] to [6], wherein color values in the L*a*b* color system measured using a spectroscopic color difference meter (light source: D65/2, measurement mode: transmission measurement) of the first material composition are L*=40 to 80, a*=−40 to 0, and b*=−60 to −20.

[8] The combination according to any one of above [1] to [7], wherein the coloring component is contained at a concentration at which precipitation does not occur after storage in a refrigerator at a set temperature of 5° C. for one month.

[9] The combination according to any one of above [1] to [8], wherein a color difference ΔE value in the L*a*b* color system measured using a spectroscopic color difference meter (light source: D65/2, measurement mode: transmission measurement) of the first material composition when comparing the composition after storage in a refrigerator at a set temperature of 5° C. for one month and the composition before the storage is 35 or less.

[10] The combination according to any one of above [1] to [9], wherein the first material composition can be stored under a condition of 2° C. to 8° C.

[11] The combination according to any one of above [1] to [10], wherein the first material composition further contains another monovalent metal salt.

[12] The combination according to any one of above [1] to [11], wherein the first material composition is in a solution state or a dry state when stored.

[13] The combination according to any one of above [1] to [12], wherein the first material composition is a composition that contains a monovalent metal salt of alginic acid, a blue to green dye that can be applied to a biological body, and sodium chloride and can be stored under a condition of 2° C. to 8° C., and the composition is in a solution state or a dry state when stored.

[14] The combination according to any one of above [1] to [13], wherein the coloring component is 0.0005% by mass to 0.05% by mass of Blue No. 1 (brilliant blue FCF).

[15] The combination according to any one of above [1] to [13], wherein the coloring component causes a color tone change according to a medium environment of the component.

[16] The combination according to above [15], wherein the medium environment is a pH environment.

[17] The combination according to above [15] or [16], wherein the first material composition is a sol or liquid having pH 6 or more and pH 8 or less, and the second material composition is a liquid having pH 4 or more and less than pH 6, or more than pH 8 and pH 12 or less.

[18] The combination according to any one of above [15] to [17], wherein the coloring component is a pH-sensitive dye or a pH-sensitive dye coated with a material for delaying dissolution.

The present invention provides the following methods for treating a subject, and for example, the following configurations may be adopted.

[2-1] A method for treating a subject, comprising:
a step of applying a first agent (material) composition containing a monovalent metal salt of alginic acid and a coloring component to the subject in a fluid state;
a step of contacting a second agent (material) composition containing a cross-linking agent having an action of cross-linking the monovalent metal salt of alginic acid with the first agent (material) composition applied to the subject to gel at least a part of the first agent (material) composition; and
a step of evaluating a formation state of a gel coat on a surface of the first agent (material) composition applied to the subject.

[2-2] The method according to above [2-1], wherein the evaluation of the formation state of the gel coat is an evaluation of the presence or absence of outflow of the composition in a fluid state of the first agent (material) composition applied to the subject.

[2-3] The method according to above [2-1] or [2-2], wherein the evaluation of the formation state of the gel coat is carried out (1) after washing of a surface of the gel coat of the first agent (material) composition applied to the subject and/or (2) after pressurization of the surface of the gel coat of the first agent (material) composition applied to the subject.

[2-4] The method according to above [2-3], wherein the pressurization of the surface of the gel coat is carried out by contacting a device with the surface of the gel coat.

[2-5] The method according to any one of above [2-1] to [2-4], wherein the subject is at least one selected from the group consisting of bone tissue, cartilage tissue, osteochondral tissue, intervertebral disc tissue, meniscal tissue, and a ligament.

[2-6] The method according to any one of above [2-1] to [2-5], wherein the first material composition contains a blue to green dye that can be applied to a biological body as the coloring component.

[2-7] The method according to any one of above [2-1] to [2-6], wherein color values in the L*a*b* color system measured using a spectroscopic color difference meter (light source: D65/2, measurement mode: transmission measurement) of the first material composition are L*=40 to 80, a*=−40 to 0, and b*=−60 to −20.

[2-8] The method according to any one of above [2-1] to [2-7], wherein the coloring component is contained at a concentration at which precipitation does not occur after storage in a refrigerator at a set temperature of 5° C. for one month.

[2-9] The method according to any one of above [2-1] to [2-8], wherein a color difference ΔE value in the L*a*b* color system measured using a spectroscopic color difference meter (light source: D65/2, measurement mode: transmission measurement) of the first material composition when comparing the composition after storage in a refrigerator at a set temperature of 5° C. for one month and the composition before the storage is 35 or less.

[2-10] The method according to any one of above [2-1] to [2-9], wherein the first material composition can be stored under a condition of 2° C. to 8° C.

[2-11] The method according to any one of above [2-1] to [2-10], wherein the first material composition further contains another monovalent metal salt.

[2-12] The method according to any one of above [2-1] to [2-11], wherein the first material composition is in a solution state or a dry state when stored.

[2-13] The method according to any one of above [2-1] to [2-12], wherein the first material composition is a composition that contains a monovalent metal salt of alginic acid, a blue to green dye that can be applied to a biological body, and sodium chloride and can be stored under a condition of 2° C. to 8° C., and the composition is in a solution state or a dry state when stored.

[2-14] The method according to any one of above [2-1] to [2-13], wherein the coloring component is 0.0005% by mass to 0.05% by mass of Blue No. 1 (brilliant blue FCF).

The present invention provides the following monovalent metal salt of alginic acid for use in treatment of a subject, and for example, the following configuration may be adopted.

[3-1] Combining of a first agent (material) composition containing a monovalent metal salt of alginic acid and a coloring component and a second agent (material) composition containing a cross-linking agent having an action of cross-linking the monovalent metal salt of alginic acid for use in treatment of a subject, the treatment comprising:

a step of applying the first agent (material) composition to the subject in a fluid state;

a step of contacting the second agent (material) composition with the first agent (material) composition applied to the subject to gel at least a part of the first agent (material) composition; and a step of evaluating a formation state of a gel coat on a surface of the first agent (material) composition applied to the subject.

The present invention provides the following bioapplicable compositions, and for example, the following configurations may be adopted.

[4-1] A bioapplicable composition comprising a monovalent metal salt of alginic acid and to be applied to a subject in a fluid state, wherein the bioapplicable composition comprises a blue to green dye that can be applied to a biological body as a coloring component.

[4-2] The bioapplicable composition according to [4-1], wherein the subject is at least one selected from the group consisting of bone tissue, cartilage tissue, osteochondral tissue, intervertebral disc tissue, meniscal tissue, and a ligament.

[4-3] The bioapplicable composition according to above [4-1] to [4-2], wherein color values in the L*a*b* color system measured using a spectroscopic color difference meter (light source: D65/2, measurement mode: transmission measurement) of the bioapplicable composition are L*=40 to 80, a*=−40 to 0, and b*=−60 to −20.

[4-4] The bioapplicable composition according to any one of above [4-1] to [4-3], wherein the coloring component is contained at a concentration at which precipitation does not occur after storage in a refrigerator at a set temperature of 5° C. for one month.

[4-5] The bioapplicable composition according to any one of above [4-1] to [4-4], wherein a color difference ΔE value in the L*a*b* color system measured using a spectroscopic color difference meter (light source: D65/2, measurement mode: transmission measurement) of the bioapplicable composition when comparing the composition after storage in a refrigerator at a set temperature of 5° C. for one month and the composition before the storage is 35 or less.

[4-6] The bioapplicable composition according to any one of [4-1] to [4-5], wherein the bioapplicable composition can be stored under a condition of 2° C. to 8° C.

[4-7] The bioapplicable composition according to any one of above [4-1] to [4-6], wherein the monovalent metal salt of alginic acid has a weight average molecular weight (absolute molecular weight) of 10,000 to 1,000,000 as measured by a GPC-MALS method.

[4-8] The bioapplicable composition according to any one of above [4-1] to [4-7], wherein the monovalent metal salt of alginic acid is a low endotoxin monovalent metal salt of alginic acid.

[4-9] The bioapplicable composition according to any one of [4-1] to [4-8], wherein the bioapplicable composition further comprises another monovalent metal salt.

[4-10] The bioapplicable composition according to any one of [4-1] to [4-9], wherein the bioapplicable composition is in a solution state or a dry state when stored.

[4-11] The bioapplicable composition according to any one of [4-1] to [4-10], wherein the bioapplicable composition is a composition that contains a monovalent metal salt of alginic acid, a blue to green dye that can be applied to a biological body, and sodium chloride and can be stored under a condition of 2° C. to 8° C., and the composition is in a solution state or a dry state when stored.

[4-12] The bioapplicable composition according to any one of [4-1] to [4-11], wherein the bioapplicable composition is a composition to be used such that at least a part of the composition is gelled when applied to the subject.

[4-13] The bioapplicable composition according to any one of above [4-1] to [4-12], wherein the coloring component is 0.0005% by mass to 0.05% by mass of Blue No. 1 (brilliant blue FCF).

Advantageous Effects of Invention

According to the present invention, when a material in which a monovalent metal salt of alginic acid is dissolved to be in a fluid state is applied to a subject, it can be easily confirmed because of containing a coloring component whether or not the treatment for gelation and fixation using a cross-linking agent having an action of cross-linking the monovalent metal salt of alginic acid thereafter is sufficient. Thereby, the reliable fixation of the material can be realized.

In addition, by using a dye that is permitted to be used in a biological body by a regulation of the country or the like as a coloring component that imparts visibility, that is, a dye that can be applied to a biological body, the material can be safely used for a human and the like.

Further, a composition containing a coloring component and a monovalent metal salt of alginic acid that can be stably stored for a certain period of time under a low temperature condition of about 2° C. to 8° C. is provided and thus is highly safe and easy to use.

The combination, treatment method, and bioapplicable composition of the present invention have one or more of the above effects.

BRIEF DESCRIPTION OF DRAWINGS

FIG. 2 is a chart illustrating results obtained by investigation of changes over time in color tone and appearance when in Test Example 2 Blue No. 1 (brilliant blue FCF), which is a dye that can be applied to the biological body, was added to a sodium alginate solution (2 w/w %) at a predetermined concentration to color the solution, which was then stored in a refrigerator set at 5° C.

DESCRIPTION OF EMBODIMENTS

Figure 1:
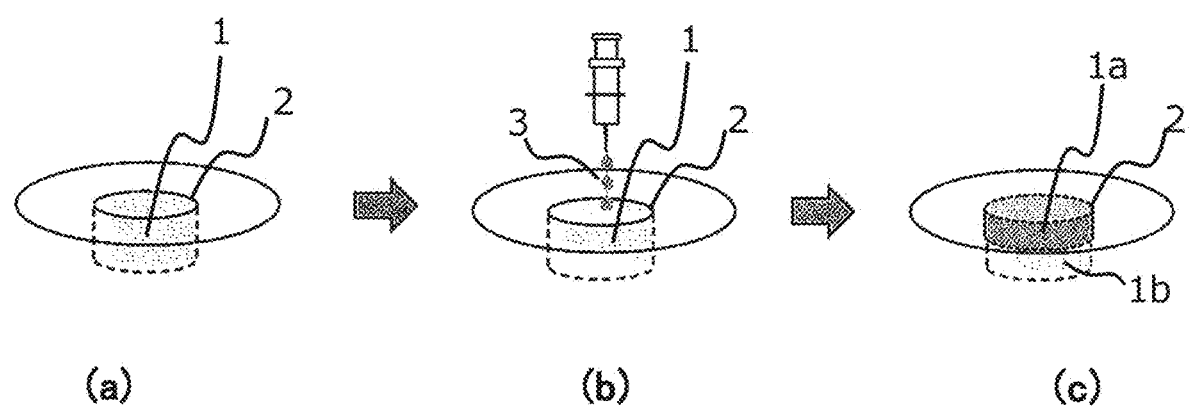
FIG. 1 is a schematic illustrative figure showing an embodiment of the present invention and illustrating the operation of applying a first agent (material) composition containing a monovalent metal salt of alginic acid and a second agent (material) composition containing a cross-linking agent having the action of cross-linking the monovalent metal salt of alginic acid to a subject.

The present invention relates to use of a monovalent metal salt of alginic acid. Specifically, it has been reported that, for example by applying a monovalent metal salt of alginic acid to an injured portion or a defect portion of cartilage, the regeneration of the cartilage tissue at that portion is promoted (Japanese Patent No. 4740369). In addition, it has been reported that, for example, by applying a monovalent metal salt of alginic acid to a cavity after removal (resection) of a nucleus pulposus of an intervertebral disc as a material for filling a nucleus pulposus, the regeneration of the nucleus pulposus of the intervertebral disc is promoted and the degeneration of the entire intervertebral disc tissue is also suppressed (Japanese Patent No. 6487110). As described above, a monovalent metal salt of alginic acid is useful in applications involving regenerating and repairing an injured or defective tissue and protecting the same. The combination, method, or bioapplicable composition of the present invention is preferably used for an injured portion or a defect portion of bone tissue, cartilage tissue, osteochondral tissue, intervertebral disc tissue, meniscal tissue, a ligament, or the like. As used herein, the "injury" also includes a "defect," a "rupture," a "lesion," and the like. The range of an organism is not limited to a human. Examples of a non-human organism include a dog, a cat, a pig, a rabbit, a sheep, a horse, a cow, a monkey, a bird, a mouse, a rat, a guinea pig, and a hamster.

In the present invention, in order to use a monovalent metal salt of alginic acid, a composition containing a monovalent metal salt of alginic acid is used as a first agent (material). In addition, as a second agent (material), a composition containing a cross-linking agent having an action of cross-linking a monovalent metal salt of alginic acid is used. Then, the first agent (material) composition is applied to a subject in a fluid state, and the second agent (material) composition is contacted with the first agent (material) composition applied to the subject to gel at least a part of the first agent (material) composition. Thereby, the first agent (material) composition applied to the subject can be fixed and prevented from being displaced or leaking from the application position.

In the present invention, in addition to the above configuration, the first material composition further contains a coloring component. Then, by observation with the coloring component as an index, the formation state of the gel coat on the surface of the first material composition applied to the subject can be evaluated. The "gel coat" as used here refers to a gel formed on the surface of the first material composition by contacting the second material composition containing a cross-linking agent with the first material composition. "Can be evaluated" is meant to include being able to visually confirm the formation state of the gel coat on the surface of the first material composition, and further meant to include being able to confirm the same not only by direct visual confirmation but also via a microscope or an endoscope (particularly in the case of joint application, an arthroscope).

The evaluation of the formation state of the gel coat can be carried out by observing whether or not the composition in a fluid state of the first material composition applied to the subject flows out, with the coloring component contained in the first material composition as an index. For example, in some typical non-limiting embodiments, the evaluation can be carried out by observing whether or not the composition in a fluid state of the first material composition applied to the subject flows out after washing the surface of the gel coat with physiological saline or the like. Alternatively, for example, whether the composition in a fluid state of the composition of the first material composition applied to the subject flows out after pressurizing the surface of the gel coat by contacting a device such as a sonde, forceps, tweezers, or the tip of an injector such as a syringe with the surface of the gel coat may be observed.

The coloring component used in the present invention is preferably one by which the formation state of the gel coat can be easily evaluated when the first material composition is applied to bone tissue, cartilage tissue, osteochondral tissue, intervertebral disc tissue, meniscal tissue, a ligament, or the like. For example, in the case of a dye exhibiting a color tone such as a neutral color (for example, green) or a cool color (for example, blue), the dye is preferable because even in an environment where surrounding tissue, blood (red/yellow color tone), cartilage (white color tone), a shadow (black color tone), or the like are included in the field of view in the procedure or the like, the dye can be more easily discriminated therefrom. Examples of such a dye include Green No. 3 (fast green FCF), copper chlorophyll, copper chlorophyllin sodium, sulfobromophthalein sodium, indocyanine green, fluorescein sodium, methylene blue, Blue No. 1 (brilliant blue FCF), Blue No. 2 (indigocarmine), toluidine blue, pyoktanin blue, and ammonium manganese phosphate.

In addition, in some embodiments, the coloring component used in the present invention is preferably a dye that is permitted to be used in a biological body by a regulation of the country or the like, that is, a dye that can be applied to a biological body, which will be described later.

In addition, in another embodiment, the coloring component used in the present invention is preferably a coloring component that can be stably stored for a certain period of time under a low temperature condition of about 2 to 8° C. when the first material composition or the bioapplicable composition is prepared according to the description of the present specification.

In some non-limiting embodiments of the invention, the coloring component may be one that causes a color tone change depending on the medium environment. According to this, when the first material composition applied to the subject flows out, the coloring component is exposed to a change in the medium environment and the color tone also changes accordingly, and thus whether or not the first material composition has leaked can be known more reliably. In addition, the formation of the gel coat occurs by contact of the second material composition containing a cross-linking agent with the first material composition as the second material composition diffuses in the vicinity of the surface of the first material composition applied to the subject. Therefore, by knowing the situation where the coloring component causes a color tone change, the color tone change reflects the gelation situation in the vicinity of the surface of the first material composition applied to the subject, and furthermore this makes it easier to know the formation state of the gel coat.

As the coloring component that causes a color tone change according to the medium environment for use in the above embodiment, a pH-sensitive dye that causes a color tone change according to the pH environment is preferable. In general, pH-sensitive dyes include a dye having a color change interval on the acidic side and a dye having a color change interval on the basic side, and thus, as desired, a dye having a suitable color change interval can appropriately be used. Tables 1 and 2 show typical pH-sensitive dyes.

TABLE 1

Typical pH-sensitive dyes (pH 4 to 6)

| Dye | Low pH color | Color change interval (pH) | High pH color |
|---|---|---|---|
| Bromophenol blue | Yellow | 3.0-4.6 | Purple |
| Congo red | Violet | 3.0-5.0 | Red |
| Methyl orange (MO) | Red | 3.1-4.4 | Orange |
| Bromocresol green | Yellow | 3.8-5.4 | Blue green |
| Methyl red (MR) | Red | 4.4-6.2 | Yellow |
| Methyl red/bromocresol green | Red | 4.5-5.2 | Green |
| Litmus | Red | 4.5-8.3 | Blue |
| Methyl purple | Purple | 4.8-5.4 | Green |
| Bromocresol purple | Yellow | 5.2-6.8 | Purple |
| p-Nitrophenol | Colorless | 5.0-7.0 | Yellow |

TABLE 2

Typical pH-sensitive dyes (pH 8 to 12)

| Dye | Low pH color | Color change interval (pH) | High pH color |
|---|---|---|---|
| Phenol red | Yellow | 6.8-8.4 | Red |
| Neutral red | Red | 6.8-8.0 | Yellow |
| Naphtholphthalein | Slightly red | 7.3-8.7 | Blue green |
| Cresol red | Yellow | 7.2-8.8 | Red purple |
| Thymol blue (basic side) | Yellow | 8.0-9.6 | Blue |
| Cresolphthalein | Colorless | 8.2-9.8 | Purple |
| Phenolphthalein (PP) | Colorless | 8.3-10.0 | Pink |
| Thymolphthalein | Colorless | 9.3-10.5 | Blue |
| Alizarin yellow R | Yellow | 10.2-12.0 | Red |
| Indigocarmine | Blue | 11.4-13.0 | Yellow |
| Malachite green (basic side) | Green | 11.6-14 | Colorless |

For example, in some typical non-limiting embodiments, when the pH of the second material composition is pH 4 or more and less than pH 6, by setting the pH of the first material composition to pH 6 or more and pH 8 or less and using a diazo-based dye such as methyl red, the effect of visually recognizing the gel coat described above can be exhibited. In addition, a sultone-based dye such as bromocresol green may be used. When the pH of the second material composition is more than pH 8 and pH 12 or less, by setting the pH of the first material composition to pH 6 or more and pH 8 or less and using a lactone-based dye such as phenolphthalein, the effect of visually recognizing the gel coat as described above can be exhibited. In addition, an anthocyanin-based dye such as anthocyanidin may be used.

As the content of the coloring component, an appropriate content can appropriately be set as needed, and as typical examples, the content is preferably 0.0005 w/v % to 1.0 w/v %, more preferably 0.001 w/v % to 1.0 w/v %, and further preferably 0.01 w/v % to 1.0 w/v % of the entire first material composition. In addition, in another embodiment, the content of the coloring component may be 0.0005 w/w % to 1.0 w/w % of the entire first material composition and is preferably 0.0005 w/w % to 0.1 w/w %. As used herein, the numerical range indicated by using "to" represents a range including the numerical values before and after "to" as the minimum value and the maximum value, respectively.

The pH-sensitive dye may be coated with a material for delaying dissolution. According to this, no color tone change due to the coloring component occurs until the material is dissolved after the passage of a certain period of time, and thus information on the passage of a certain amount of time after the second material composition comes into contact with the first material composition can be visualized together. Examples of a material for delaying dissolution that can be used in such an embodiment include CMEC (carboxymethylethylcellulose), methacrylic acid copolymer S, methacrylic acid copolymer L, or a mixture thereof in which a pH range in which it is dissolved is appropriately regulated within the range of pH 8 to 12 by the mixing thereof at an appropriate ratio. In addition, examples of a method for coating a dye include a method involving microencapsulation using a material for delaying dissolution, a method involving kneading with a material for delaying dissolution followed by granulation by pulverization or extrusion granulation, and a method involving forming a fine particle by a spray-drying method, and the coated dye can be prepared by such a well-known method.

In FIG. 1, as an embodiment of the present invention, the application of the above two agents (materials) to a cartilage defect portion is taken as an example, and the operation thereof is described in more detail.

First, a first agent (material) composition 1 containing a monovalent metal salt of alginic acid is prepared into a fluid composition in a sol or liquid state, and a cartilage defect portion 2 is filled with the composition using an injector such as a syringe which is not shown (FIG. 1a). For example, the procedure of a bone marrow stimulation technique that promotes bleeding from the bone marrow and induces a cartilage progenitor cell derived from the bone marrow in anticipation of differentiation thereof into cartilage may be applied to the cartilage defect portion 2. In the bone marrow stimulation technique, specifically, one or more holes having a diameter of about 1.5 mm and reaching subchondral bone may be formed using a pick, a power drill, or the like. In addition, when a cartilage progenitor cell derived from the bone marrow remains in a cartilage injured portion, one or more holes having a diameter of about 1.5 mm and not reaching subchondral bone may be formed similarly.

Next, a second agent (material) composition 3 containing a cross-linking agent having the action of cross-linking a monovalent metal salt of alginic acid is dropped onto the surface of the first agent (material) composition 1 filling the cartilage defect portion 2, from an injector such as a syringe (FIG. 1B). The cross-linking agent contained in the second agent (material) composition 3 diffuses over the entire vicinity of the surface of the first agent (material) composition 1 with the diffusion of the second agent (material) composition 3 (the portion indicated by reference sign "1a" in FIG. 1), a cross-linking action on the monovalent metal salt of alginic acid is exerted, and thereby a gel coat is formed on the surface of the first agent (material) composition 1 filling the cartilage defect portion 2, such that the opening of the cartilage defect portion 2 is covered (FIG. 1c). As described above, the first agent (material) composition 1 which was in a fluid state at the time of filling the cartilage defect portion 2 is fixed to the cartilage defect portion 2, and the application position thereof is prevented from shifting or the first agent (material) composition 1 is prevented from leaking from the cartilage defect portion 2. The inside of the first agent (material) composition 1 other than the vicinity of the surface (the portion indicated by reference sign "1*b*" in FIG. 1) may not necessarily be gelled. Rather, non-gelation may favor the migration and organization of a progenitor cell that forms the basis of the tissue.

In the present invention, a scheme for applying the first material composition containing a monovalent metal salt of alginic acid to the subject, and then allowing the second material composition containing a cross-linking agent having the action of cross-linking the monovalent metal salt of alginic acid to act is not particularly limited and examples of a typical procedure for a biological body include a procedure involving placing an affected area under direct vision by incision. In addition, a percutaneous procedure (an incision of about 5 mm) may be used. Alternatively, as a less invasive procedure choice, the procedure may be carried out under a microscope (an incision of about 3 to 4 cm) or under an endoscope (particularly in the case of joint application, an arthroscope) (an incision of about 1 to 2 cm). According to the present invention, the visibility of the first material composition at the time of application thereof is improved, and thus when a procedure with a limited field of view like a procedure under a microscope or an endoscope (particularly in the case of joint application, an arthroscope) is adopted, the merit is particularly great. For example, when the first material composition 1 is injected into the cartilage defect portion 2 until it reaches the same height as the surrounding tissue in a narrow joint space under arthroscopy, if the composition is transparent, it cannot be known whether or not the portion has been appropriately filled with the composition and thus the procedure is difficult. By coloring the composition, the state of filling can be seen and thus appropriate filling is possible.

In some non-limiting embodiments of the present invention, the activity of the first material composition on the second material composition can also be evaluated in advance by an in vitro test. That is, the evaluation may be made in advance as follows: using the same usage ratio as in actual use, for example, 500 μL of the first material composition is placed in a test tube having a diameter of 6 mm, the test tube is filled from the top thereof with the second material composition in which the cross-linking agent is prepared at a predetermined usage ratio and allowed to stand for 1 hour, then the surface portion of the composition in the test tube is gelled, whereas at least 50% of the volume of the composition in the test tube is not gelled and for the non-gelled portion, at least 50% of the volume of the composition in the test tube can be aspirated using a syringe equipped with a 21 G injection needle, and so on.

Hereinafter, the present invention will be described in more detail.

1. Monovalent Metal Salt of Alginic Acid

Alginic acid is a biodegradable high molecular weight polysaccharide, which is a polymer in which two uronic acids, D-mannuronic acid (M) and L-guluronic acid (G), are linearly polymerized. More specifically, alginic acid is a block copolymer in which the homopolymer fraction of D-mannuronic acid (MM fraction), the homopolymer fraction of L-guluronic acid (GG fraction), and the randomly arranged fraction of D-mannuronic acid and L-guluronic acid (MG fraction) are arbitrarily bonded. The constituent ratio (M/G ratio) of D-mannuronic acid and L-guluronic acid of alginic acid differs mainly depending on the type of an organism from which seaweed or the like is derived, and is also affected by the habitat of the organism and a season; and the ratio ranges broadly from a high G type having an M/G ratio of about 0.4 to a high M type having an M/G ratio of about 5.

Alginic acid may be naturally occurring or synthetic, and for example, naturally occurring alginic acid derived from a brown alga or the like may be used. An alginic acid-containing brown alga flourishes in coastal areas around the world, but in practice, the brown alga that can be used as a raw material is limited and typical examples of such a brown alga include *Lessonia* in South America, *Macrocystis* in North America, *Laminaria* and *Ascophyllum* in Europe, and *Durvillea* in Australia. Examples thereof include *Lessonia* species, *Macrocystis* species, *Laminaria* species, *Ascophyllum* species, *Durvillea* species, *Eisenia* species, and *Ecklonia* species.

In the present invention, a monovalent metal salt of alginic acid is used. According to this, the monovalent metal salt of alginic acid has good solubility and dissolution stability, and is a form suitable for being applied to a subject such as a biological tissue in a state of being fluid by being dissolved in a solvent such as water. The monovalent metal salt of alginic acid can be prepared by a known method such as an acid method or a calcium method or a method similar thereto using the brown alga described above. Specifically, the monovalent metal salt of alginic acid can be obtained, for example, by extraction from a brown alga using an alkaline aqueous solution such as a sodium carbonate aqueous solution, neutralization using an acid (for example, hydrochloric acid or sulfuric acid), and then ion exchange treatment or the like. Specific examples of the monovalent metal salt of alginate include sodium alginate and potassium alginate, and sodium alginate, which can be obtained as a commercially available product, is particularly preferable.

It is usually difficult to accurately determine the molecular weight of a high molecular weight polysaccharide such as the monovalent metal salt of alginic acid used in the present invention, and if the molecular weight is too low, the apparent viscosity when the polysaccharide is dissolved in water or the like decreases and the close adhesion to a subject such as a biological tissue to which the polysaccharide is applied may be weakened, and if the molecular weight is too high, it is difficult to prepare such a polysaccharide and for example the following problems occur: the solubility decreases, when the polysaccharide is dissolved in water or the like the polysaccharide has a too high apparent viscosity and is difficult to handle, and it is difficult to maintain a physical property thereof after long-term storage; and thus the weight average molecular weight is generally in the range of 10,000 to 10,000,000, preferably 20,000 to 8,000,000, and more preferably 50,000 to 5,000,000.

The molecular weight of the monovalent metal salt of alginic acid used in the present invention can be measured according to a conventional method. As an example, for example, under typical conditions when gel permeation chromatography is used for molecular weight measurement, as a column, for example, GMPW-XL×2+G2500PW-XL (7.8 mm ID×300 mm) can be used, as an eluent, for example, a 200 mM sodium nitrate aqueous solution can be used, and as a molecular weight standard, for example, pullulan can be used. In addition, as another example, under typical conditions when GPC-MALS is used for molecular weight measurement, as detectors, for example, an RI detector and a light scattering detector (MALS) can be used.

In general, it is known that in the measurement of the molecular weight of a polymer substance derived from a natural product, the value can differ depending on the measurement method. Therefore, regarding the molecular weight of the monovalent metal salt of alginic acid used in the present invention, for example, the weight average molecular weight measured by gel permeation chromatography (GPC) or gel filtration chromatography (collectively also referred to as size exclusion chromatography) is preferably 100,000 or more, more preferably 500,000 or more, and preferably 5,000,000 or less, more preferably 3,000,000 or less. The preferable range thereof is 100,000 to 5,000,000, and more preferably 500,000 to 3,500,000.

In addition, for example, according to the GPC-MALS method in which gel permeation chromatography (GPC) and a multi-angle light scattering detector (MALS) are combined, the absolute weight average molecular weight can be measured. Regarding the molecular weight of the monovalent metal salt of alginic acid used in the present invention, the weight average molecular weight (absolute molecular weight) measured by the GPC-MALS method is preferably 10,000 or more, more preferably 80,000 or more, further preferably 90,000 or more, and preferably 1,000,000 or less, more preferably 800,000 or less, further preferably 700,000 or less, especially preferably 500,000 or less. The preferable range thereof is 10,000 to 1,000,000, more preferably 80,000 to 800,000, more further preferably 90,000 to 700,000, and especially preferably 90,000 to 500,000.

Usually, when the molecular weight of a high molecular weight polysaccharide is calculated by the above method, a measurement error of 10 to 20% or more can occur. For example, a variation in value can occur in the range of about 320,000 to 480,000 for 400,000, about 400,000 to 600,000 for 500,000, and about 800,000 to 1,200,000 for 1,000,000.

The monovalent metal salt of alginic acid tends to have a large molecular weight and a high apparent viscosity when it is initially extracted from a brown alga, and, after it undergoes processes such as drying by heat and purification, has a smaller molecular weight and a lower apparent viscosity. Monovalent metal salts of alginic acid having different molecular weights can be produced by a method such as controlling a condition such as temperature in the production step, selecting a brown alga as a raw material, or fractionating the molecular weight in the production step. Further, a monovalent metal salt of alginic acid having a target molecular weight can also be obtained by mixing with a monovalent metal salt of alginic acid from another lot having a different molecular weight or viscosity.

Therefore, the quality of the monovalent metal salt of alginic acid used in the present invention can be tested not only by the molecular weight described above but also by the properties of viscosity. In this regard, for example, the viscosity when the monovalent metal salt of alginic acid is dissolved in Milli-Q water to obtain a solution having a concentration of 1 w/w % and viscosity measurement is carried out under a condition of 20° C. using a cone plate type viscometer is preferably 40 mPa·s to 800 mPa·s and more preferably 50 mPa·s to 600 mPa·s.

The monovalent metal salt of alginic acid used in the present invention is preferably subjected to endotoxin reduction treatment. According to this, the monovalent metal salt of alginic acid can be more safely applied to a subject such as a biological tissue without causing heat generation or the like. The endotoxin level can be confirmed by a known method and can be measured by, for example, a method using a Limulus reagent (LAL) or a method using Endospecy (registered trademark) ES-24S Set (Seikagaku Corporation).

Endotoxin reduction treatment can be carried out by a known method that is known for a polymer material derived from a natural product or a method similar thereto. The treatment can be carried out by, for example, the method of Suga et al. involving purifying sodium hyaluronate (see, for example, Japanese Patent Laid-Open No. 9-324001), the method of Yoshida et al. involving purifying β-1,3-glucan (see, for example, Japanese Patent Laid-Open No. 8-269102), the method of William et al. involving purifying a high molecular weight salt such as an alginate or gellan gum (see, for example, Japanese Translation of PCT International Application Publication No. 2002-530440), the method of James et al. (see, for example, International Publication No. WO 93/13136) or the method of Lewis et al. (see, for example, U.S. Pat. No. 5,589,591) involving purifying a polysaccharide, or the method of Hermann Frank et al. involving purifying an alginate (see, for example, Appl Microbiol Biotechnol (1994) 40:638-643) or a method similar to these. The endotoxin reduction treatment of the present invention is not limited to these, and can be carried out by a known method such as washing, filtration using a filter (endotoxin removing filter, charged filter, or the like), ultrafiltration, purification using a column (endotoxin adsorption affinity column, gel filtration column, column with an ion exchange resin, or the like), adsorption to a hydrophobic substance, a resin, an activated carbon, or the like, an organic solvent treatment (extraction using an organic solvent, precipitation/sedimentation by addition of an organic solvent, or the like), or a surfactant treatment (for example, Japanese Patent Laid-Open No. 2005-036036) or by appropriately combining these. A known method such as centrifugation may be appropriately combined with steps of these treatments. It is desirable to appropriately select the method according to the type of the monovalent metal salt of alginic acid and the like.

The method of endotoxin reduction treatment is not particularly limited, and as a result thereof, when endotoxin measurement is carried out by a Limulus reagent (LAL), the endotoxin content is preferably 500 endotoxin units (EU)/g or less, more preferably 100 EU/g or less, further preferably 50 EU/g or less, and particularly preferably 30 EU/g or less. Sodium alginate subjected to endotoxin reduction treatment can be obtained as a commercially available product such as Sea Matrix (registered trademark) (Mochida Pharmaceutical Co., Ltd.) or PRONOVATMUP LVG (FMC BioPolymer).

2. Cross-Linking Agent

In the present invention, a cross-linking agent having the action of cross-linking a monovalent metal salt of alginic acid is used. Specific examples thereof include a divalent or higher valent metal ion compound such as $Ca^{2+}$, $Mg^{2+}$, $Ba^{2+}$, or $Sr^{2+}$. More specifically, examples of the divalent or higher valent metal ion compound include $CaCl_2$, $MgCl_2$, $CaSO_4$, and $BaCl_2$, and a $CaCl_2$ solution is particularly preferable because of the easy availability, gel strength, and the like thereof 3. First Agent (Material) Composition The first agent (material) composition in the present invention may be any one containing the monovalent metal salt of alginic acid described above and the coloring component described in the present specification, and the pharmaceutical form thereof is not particularly limited. For example, the first agent (material) composition once prepared as a solution may be freeze-dried or the like and provided in a dry state. However, the first agent (material) composition needs to have certain fluidity and viscosity properties when it is applied to a subject such as a biological tissue. Therefore, at the time of application, the first agent (material) composition is preferably in a sol or liquid state (herein, these states are collectively referred to as a "solution state"). The solvent for that is not particularly limited, and examples thereof include purified water, distilled water, ion exchanged water, Milli-Q water, physiological saline, and phosphate buffered saline (PBS). These are preferably sterilized and preferably subjected to endotoxin reduction treatment. For example, Milli-Q water can be sterilized by filtration before use. That is, the first material composition is preferably in a solution state or a dry state when it is stored (or provided).

In addition, as will be described later, the first material composition in the present invention may contain a component other than the monovalent metal salt of alginic acid described above, and the operation for obtaining the first material composition such as a mixing operation thereof is desirably carried out in an environment where the endotoxin level and the bacterial level are low. For example, the operation is preferably carried out on a clean bench using a sterile device, and the device used may be treated using a commercially available endotoxin removing agent.

The first material composition in the present invention has, for example, a fluidity that, after allowing the composition to stand at 20° C. for 1 hour, allows injection of the composition using a 21 G injection needle, as a property when applied to a subject such as a biological tissue. At this time, if the viscosity is too low, the close adhesion to the surrounding tissue of the application site may be weakened, and thus the apparent viscosity is not particularly limited and is preferably 10 mPa·s or more, more preferably 100 mPa·s or more, further preferably 200 mPa·s or more, and especially preferably 500 mPa·s or more. If the apparent viscosity is too high, the handleability may deteriorate, and thus the apparent viscosity is preferably 50000 mPa·s or less, more preferably 20000 mPa·s or less, and further preferably 10000 mPa·s or less. When the apparent viscosity is 20000 mPa·s or less, the first material composition can be more easily applied using a syringe or the like. However, even if the apparent viscosity is 20000 mPa·s or more, the first material composition can be applied using a pressure type or electric type filling device or another unit. The preferable range of the composition of the present invention is 10 mPa·s to 50000 mPa·s, more preferably 100 mPa·s to 30000 mPa·s, further preferably 200 mPa·s to 20000 mPa·s, further more preferably 500 mPa·s to 20000 mPa·s, and especially preferably 700 mPa·s to 20000 mPa·s. In another preferable embodiment, the apparent viscosity may be 500 mPa·s to 10000 mPa·s or 2000 mPa·s to 10000 mPa·s. The compositions of some non-limiting embodiments of the present invention have viscosities at which the compositions can also be applied to a subject using a syringe or the like.

The apparent viscosity of the first material composition can be measured according to a conventional method. The apparent viscosity can be measured using, for example, a coaxial double cylinder type rotational viscometer, a single cylinder type rotational viscometer (Brookfield type viscometer), or a cone-plate type rotational viscometer (cone plate type viscometer) by a rotational viscometer method. It is preferably desirable to follow the viscosity measurement method of the Japanese Pharmacopoeia (16th edition). The viscosity measurement is desirably carried out under a condition of 20° C. As will be described below, if the first material composition in the present invention contains anything insoluble such as a cell that is contained in a solvent, the apparent viscosity is preferably an apparent viscosity in a state where something like a cell is not dissolved in a solvent in order to accurately carry out viscosity measurement.

The apparent viscosity of the first material composition is more preferably measured using particularly a cone plate type viscometer and a sensor 35/1 (cone diameter of 35 mm, 1°). For example, it is desirable to measure the apparent viscosity under the following measurement conditions. A sample solution is prepared using Milli-Q water. The measurement temperature is 20° C. The rotation speed of the cone plate type viscometer is 1 rpm when measuring a 1% solution of a monovalent metal salt of alginic acid, and 0.5 rpm when measuring a 2% solution thereof, and using this as a guide, the rotation speed is determined. In the case of measuring a 1% solution of a monovalent metal salt of alginic acid, the reading time is 2 minutes of measurement to obtain an average value of the values taken during the period of 1 minute to 2 minutes after the start of the measurement. In the case of measuring a 2% solution, the reading time is 2.5 minutes of measurement to obtain an average value of the values taken during the period of 0.5 minutes to 2.5 minutes after the start of the measurement. The test value is an average value of three times of measurements.

The apparent viscosity of the first material composition can be adjusted, for example, by the concentration of the monovalent metal salt of alginic acid in the composition, the molecular weight or the M/G ratio of the monovalent metal salt of alginic acid used, or the like. Alternatively, the apparent viscosity can also be adjusted by using two or more monovalent metal salts of alginic acid from different lots having properties of different molecular weights or viscosities in combination.

In adjusting the apparent viscosity of the first material composition, when the concentration of the monovalent metal salt of alginic acid in the composition is high, the apparent viscosity tends to be high, and when the concentration is low, the apparent viscosity tends to be low. In addition, when the molecular weight of the monovalent metal salt of alginic acid is large, the apparent viscosity tends to be high, and when the molecular weight is small, the apparent viscosity tends to be low. In addition, the apparent viscosity is affected by the M/G ratio of the monovalent metal salt of alginic acid used. In this regard, the M/G ratio of the monovalent metal salt of alginic acid used in the present invention is preferably 0.1 to 5.0, more preferably 0.1 to 4.0, and further preferably 0.2 to 3.5.

In general, the M/G ratio is mainly determined by the type of the seaweed and the like, and thus the type of the brown alga used as a raw material affects the viscosity properties of the monovalent metal salt of alginic acid obtained. In this regard, the monovalent metal salt of alginic acid used in the present invention is preferably derived from a brown alga belonging to the genus *Lessonia*, the genus *Macrocystis*, the genus *Laminaria*, the genus *Ascophyllum*, the genus *Durvillea*, or the like and more preferably derived from a brown alga belonging to the genus *Lessonia*, and particularly preferably derived from *Lessonia nigrescens*.

In order to have a property of a certain viscosity, the content of the monovalent metal salt of alginic acid is affected by the molecular weight, and thus cannot be unconditionally determined, and is preferably 0.1 w/v % or more, more preferably 0.5 w/v % or more, and further preferably 1 w/v % or more of the entire first material composition in the present invention. Further specifically, the concentration of the monovalent metal salt of alginic acid is preferably 0.5 w/v % to 5 w/v %, more preferably 1 w/v % to 5 w/v %, further preferably 1 w/v % to 3 w/v %, and especially preferably 1.5 w/v % to 2.5 w/v %. In addition, in another embodiment, the concentration of the monovalent metal salt of alginic acid may be preferably 0.5 w/w % to 5 w/w %, more preferably 1 w/w % to 5 w/w %, further preferably 1 w/w % to 3 w/w %, and especially preferably 1.5 w/w % to 2.5 w/w %.

In the first material composition in the present invention, from the viewpoint of being more safely applied to a target such as a biological tissue without causing heat generation or the like, when endotoxin measurement using a Limulus reagent (LAL) is carried out using a monovalent metal salt of alginic acid subjected to the endotoxin reduction treatment as described above, the endotoxin content of the composition is preferably 500 endotoxin units (EU)/g or less, more preferably 300 EU/g or less, further more preferably 150 EU/g or less, and particularly preferably 100 EU/g or less.

In the present invention, it is not always necessary for the first material composition to contain a cell for the purpose of tissue regeneration or the like. However, this does not rule out the use of such a cell completely. That is, in some non-limiting embodiments of the present invention, the first material composition may contain a cell. Examples of the cell include a nucleus pulposus cell, a stem cell, a stromal cell, a mesenchymal stem cell, and a bone marrow stromal cell, and the origin thereof is particularly limited and examples thereof include an intervertebral disc nucleus pulposus, bone marrow, adipose tissue, and umbilical cord blood. In addition, examples of the cell also include an ES cell and an iPS cell.

Specifically, the cell used can be collected from an intervertebral disc nucleus pulposus, bone marrow, adipose tissue, umbilical cord blood, or the like as needed, and the treatment of concentrating the target cell or the treatment of culturing the same to increase the number thereof can be carried out to use the prepared cell. Then, although it depends on the type of the cell, the first material composition can contain the cell, typically, at, for example, $1 \times 10^4$ cells/ml or more or $1 \times 10^5$ cells/ml or more, and preferably $1 \times 10^4$ cells/ml to $1 \times 10^7$ cells/ml. As the above cell, a commercially available cell may be obtained and used.

In some non-limiting embodiments of the present invention, the first material composition may contain a factor that promotes cell growth. Examples of such a factor include BMP (Bone morphogenetic protein), FGF (Fibroblast growth factor), VEGF (Vascular endothelial growth factor), HGF (Hepatocyte growth factor), TGF-β (Transforming growth factor-β), and IGF-1 (Insulin-like growth factor-1), PDGF (Platelet-derived growth factor), CDMP (Cartilage-derived-morphogenetic protein), CSF (Colony stimulating factor), EPO (Erythropoietin), IL (Interleukin), PRP (Platelet rich plasma), SOX (transcription factor), and IF (Interferon). These factors may be produced by a recombinant method or may be purified from a protein composition. In another non-limiting embodiment of the present invention, the first material composition does not include these factors. Even when the growth factor is not included, the action and effect of the monovalent metal salt of alginic acid such as regeneration of cartilage tissue is sufficiently good, and the safety is also higher than that in the case of actively suppressing cell death.

In some non-limiting embodiments of the present invention, the first material composition may contain a factor that suppresses cell death. Examples of a factor that causes cell death include Caspase and TNFα, and examples of a factor that suppresses these include an antibody and siRNA. These factors that suppress cell death may be produced by a recombinant method or may be purified from a protein composition. In another non-limiting embodiment of the present invention, the first material composition does not include these factors. Even when the factor that suppresses cell death is not included, the action and effect of the monovalent metal salt of alginic acid such as regeneration of cartilage tissue is sufficiently good, and the safety is also higher than that in the case of actively suppressing cell death.

In some non-limiting embodiments of the invention, the first material composition may further contain, as needed, a component usually used in a pharmaceutical, such as another pharmaceutically active component or a commonly used component such as a stabilizer, an emulsifier, an osmoregulator, a buffering agent, a tonicity agent, a preservative, or a soothing agent. Specifically, for example, the first material composition may contain a monovalent metal salt such as sodium chloride or potassium chloride, an ammonium salt such as ammonium chloride, or the like, and is preferably a monovalent metal salt and more preferably sodium chloride.

In the present invention, the first material composition basically does not necessarily require a cross-linking agent that gels the composition. However, in some embodiments of the present invention, the first material composition may include a cross-linking agent in an amount such that the composition is gelled for the first time after the passage of a certain period of time. The certain period of time as used here is not particularly limited, and is preferably about 30 minutes to 12 hours. The absence of a cross-linking agent in an amount that gels the composition may be indicated, for example, by being able to inject the composition using a syringe equipped with a 21 G needle after allowing the composition to stand at 20° C. for 1 hour. On the other hand, in some other non-limiting embodiments of the present invention, the first material composition does not include a cross-linking agent.

4. Second Agent (Material) Composition

The second agent (material) composition in the present invention may be any one containing the cross-linking agent described above, and the pharmaceutical form thereof is not particularly limited. For example, the second agent (material) composition once prepared as a solution may be freeze-dried or the like and provided in a dry state. However, use of an injector such as a syringe when the second agent (material) composition is used is easy to operate and convenient. Therefore, the second agent (material) composition is preferably used in a liquid state when it is applied. The solvent for that is not particularly limited, and examples thereof include purified water, distilled water, ion exchanged water, Milli-Q water, physiological saline, and phosphate buffered saline (PBS). These are preferably sterilized and preferably subjected to endotoxin reduction treatment. For example, Milli-Q water can be sterilized by filtration before use.

In addition, the second material composition in the present invention may contain a component other than the cross-linking agent described above, and the operation for obtaining the second material composition such as a mixing operation thereof is desirably carried out in an environment where the endotoxin level and the bacterial level are low, as for the first material composition described above. For example, the operation is preferably carried out on a clean bench using a sterile device, and the device used may be treated using a commercially available endotoxin removing agent.

The concentration and the like of the cross-linking agent in the second material composition may be appropriately set according to the type and the like of the cross-linking agent used. In some non-limiting embodiments of the present invention, for example, when $CaCl_2$ is used as a crosslinking agent, the concentration thereof also varies depending on the concentration, the molecular weight, or the like of the monovalent metal salt of alginic acid of the first material composition applied, and cannot be unconditionally determined, and may be preferably 10 mM to 1000 mM, more preferably 25 mM to 200 mM, and especially preferably 50 mM to 150 mM.

5. Bioapplicable Composition

In another viewpoint of the invention, the invention further provides a bioapplicable composition. As used herein, the "bioapplicable composition" refers to the first material composition, in the combination of the compositions or the treatment method described above, that uses a dye that is permitted to be used in a biological body by a regulation of the country or the like, that is, a dye that can be applied to a biological body, as a coloring component. Therefore, the "bioapplicable composition" is a form of the "first material composition," the term "first material composition" is used to refer inclusively to a "bioapplicable composition," and unless otherwise specified, the "first material composition" can be read as a "bioapplicable composition" for use. That is, this bioapplicable composition contains a coloring component and a monovalent metal salt of alginic acid and is applied to a subject in a fluid state, and is used preferably such that at least a part thereof is gelled when the bioapplicable composition is applied to the subject. Then, by containing a coloring component, the state of gelation when the bioapplicable composition is applied to a subject can reliably be visually recognized, and further, by using a dye that is permitted to be used in a biological body by a regulation of the country or the like as a coloring component, that is, a dye that can be applied to a biological body, the bioapplicable composition can be safely used for a human and the like. Examples of the dye that can be applied to a biological body according to a regulation of the country or the like include a dye approved for use in a pharmaceutical, a quasi-drug, and a cosmetic by the Ministry of Health, Labor and Welfare in Japan, and a dye approved for use in a pharmaceutical, a medical device, a cosmetic, and the like by the FDA in the United States. In addition, the coloring component is preferably such that it is easy to evaluate the formation state of the gel coat when the bioapplicable composition is applied to bone tissue, cartilage tissue, osteochondral tissue, intervertebral disc tissue, meniscal tissue, a ligament, and the like, and is preferably a blue to green dye from the viewpoint of discriminability. Examples of such a coloring component include Green No. 3 (fast green FCF), Blue No. 1 (brilliant blue FCF), Blue No. 2 (indigocarmine), Green No. 201 (alizarin cyanin green F), Green No. 202 (quinizarin green SS), Blue No. 201 (indigo), Blue No. 202 (patent blue NA), and Blue No. 203 (patent blue CA), and the coloring component is more preferably Green No. 3 (fast green FCF) or Blue No. 1 (brilliant blue FCF).

In the first material composition or the bioapplicable composition provided by the present invention, the above dye is preferably contained at a concentration that imparts visibility due to the dye and at a concentration that does not cause precipitation during the refrigerated storage. According to this, even when the dye contained in the composition as a coloring component that imparts visibility is subjected to refrigerated storage before applied to a subject, the dispersibility or uniformity thereof can be kept stable and the state of gelation when applied to the subject can be visually recognized more reliably.

Whether or not the concentration of the dye in the composition is a concentration that imparts visibility may be visually confirmed, or may be evaluated by measuring the color. For example, the L*a*b* color space used to represent the color of an object was standardized by the International Commission on Illumination (CIE) in 1976, and is also a color system adopted by a Japanese Industrial Standard (RS Z 8781-4) in Japan. L* represents the lightness of the color, L*=0 is black, and L*=100 is the diffuse color of white, and L* is represented by a numerical value of 0 to 100. Chromaticity (hue and saturation) is represented by numerical values of a* and b*. a* and b* represent color directions, a* represents the red direction, −a* represents the green direction, b* represents the yellow direction, and −b* represents the blue direction; and the larger the number, the more vivid the color, and the smaller the number, the duller the color.

In Test Example 1 herein, for the range of the L*a*b* color system of a 2 w/w % sodium alginate solution containing Blue No. 1 at a concentration of 0.001 to 0.01 w/w %, when measurement was carried out in a normal temperature (15 to 25° C.) environment using a spectroscopic color difference meter (SE-6000) (manufactured by Nippon Denshoku Industries Co., Ltd.) with a light source of D65/2 and a measurement mode of transmission measurement, L* (lightness) was 40 to 80, a* was −40 to −5 (green direction), and b* was −60 to −20 (blue direction). If the color is in this range, it is easy to discriminate the color from cartilage and the surrounding tissue, and it is easy to evaluate the formation state of the gel coat. In particular, if the numerical value of L* (lightness) is too low (close to 0), the black tendency of the composition becomes strong, and the discrimination is difficult because of the shadow at the time of application. In addition, if L* is too high (close to 100), the white tendency of the composition becomes strong, and it is difficult to discriminate the composition from white cartilage or the like. In fact, it was confirmed that a 2 w/w % sodium alginate solution containing Blue No. 1 at a concentration of 0.1 w/w % has a strong black tendency and is not suitable for use in the present invention. Therefore, the preferable ranges of color values in the L*a*b* color system of the first material composition or the bioapplicable composition of the present invention are 40 to 80 for L* (lightness), −40 to 0 for a*, and −60 to −20 for b*.

In such an L*a*b* color space, a more objective evaluation can be made by using a value of the color difference ΔE represented by the following expression (1) or the like as an index. Here, it is said that the color difference in which a human has an image of a clearly different color name is about 13 to 25 as the value of the color difference ΔE represented by the following expression (1). Most parts of cartilage tissue, intervertebral disc tissue, surrounding tissues thereof, and the like have a color tone of white or red (a* is a positive numerical value) to yellow (b* is a positive numerical value), and a* and b* values are each often a positive value. In the first material composition or the bioapplicable composition of the present invention, a* is −40 to 0 and b* is −60 to −20, and it can be seen that a sufficient difference in color tone can be obtained.

[Expression 1]

$$\Delta E^*_{ab} = \sqrt{(L_2^* - L_1^*)^2 + (a_2^* - a_1^*)^2 + (b_2^* - b_1^*)^2} \tag{1}$$

wherein L1*, a1*, and b1* are values of the L*a*b* color space of a comparative control, and L2*, a2*, and b2* are values of the L*a*b* color space of a sample of a subject when measured.

The L*, a*, and b* values can be measured using, for example, a spectroscopic color difference meter ("SE-6000," manufactured by Nippon Denshoku Industries Co., Ltd.). The spectroscopic color difference meter may also be referred to as a spectroscopic colorimeter or the like.

On the other hand, whether or not the concentration of the dye in the composition is a concentration at which precipitation does not occur during the refrigerated storage can be determined by, for example, storing the composition for a certain period of time (for example, 1 day, 1 week, 2 weeks, 3 weeks, 1 month, 2 months, 3 months, 4 months, 5 months, 6 months, 1 year, 2 years, or 3 years) in a refrigerator (for example, set temperature: 2° C., 3° C., 4° C., 5° C., 6° C., 7° C., or 8° C.) and visually observing the presence or absence of precipitation, or carrying out filtration using a filter (0.45-µm hole) and then measuring the color difference of the composition between before and after the filtration. In the present invention, unless otherwise specified, the composition is stored in a refrigerator at a set temperature of 5° C. for one month for evaluation. In this case, a state in which the color tone cannot be visually recognized can be detected as a decrease in the value of the color difference represented by the above expression (1). That is, this is because when the precipitation of the dye occurs, the amount of the dye dissolved decreases, which in turn reduces the degree of color tone. Alternatively, the evaluation may be made with a focus on a specific chromaticity value such as an a* value or a b* value. Therefore, the concentration of the coloring component in the composition is preferably a concentration such that for example, with a focus on a b* value if the coloring component is blue, the difference between the b* value after storage in a refrigerator set at 5° C. for one month and the b* value before the storage is kept in the range of 25 or less.

In addition, the color of the first material composition or the bioapplicable composition of the present invention is preferably stable even after storage for a certain period of time as described above. In some embodiments of the present invention, the value of the color difference ΔE between the composition after storage in a refrigerator at a set temperature of 5° C. for one month and the composition before the storage is preferably 35 or less and more preferably 30 or less.

In addition, the first material composition or the bioapplicable composition of the present invention is preferably a composition that does not cause precipitation of the coloring component even after storage for a certain period of time (for example, one month) as described above, for example under a low temperature condition of about 2° C. to 8° C. (for example, in a refrigerator set at 5° C.), that is, can be stably stored.

Typical examples of the dye that can be applied to the biological body used in the present invention include Blue No. 1 (brilliant blue FCF), Blue No. 2 (indigocarmine), and Green No. 3 (fast green FCF). In particular, Blue No. 1 (brilliant blue FCF) is preferably used, and the concentration range thereof may be 0.0005% by mass or more and 0.05% by mass or less, or 0.001% by mass or more and 0.01% by mass.

6. Combination

As used herein, the "combination" may be present so that the first agent (material) composition and the second agent (material) composition are used in the present invention when applied to a subject, and the method for providing the first agent (material) composition and the second agent (material) composition is not particularly limited. For example, the first material composition and the second material composition may be provided as a kit, or only the first material composition is provided, and the second material composition may be separately prepared from a commercially available product and used.

The first material composition may be in a solution state or a dry state when stored (or provided), and, when in a dry state, preferably includes a freeze-dried product of a monovalent metal salt of alginic acid. The first material composition may be encapsulated in a vial or a prefilled syringe.

When the first material composition and the second material composition are provided as a kit, for example, (1) a prefilled syringe encapsulating a solution including sodium alginate, a blue to green dye that can be applied to a biological body such as Blue No. 1, and a monovalent metal salt such as sodium chloride as the first material composition, (2) an ampule encapsulating a solution of a divalent or higher metal ion compound such as a calcium chloride solution as the second material composition, (3) a syringe, (4) an injection needle, or the like can be put in one package to prepare a kit. In addition, for example, (1) a solution of the first material composition and (2) a solution of the second material composition may each be encapsulated in a double syringe that can separately encapsulate two solutions, and provided.

7. How to Use Combination

The combination of the present invention is used in such a way as to apply the first agent (material) composition to a subject in a fluid state and contact the second agent (material) composition with the first agent (material) composition applied to the subject to gel at least a part of the first agent (material) composition. Details of application of the first material composition to a subject, gelation of the first material composition, evaluation of the formation state of the gel coat, and the like are as described in the Description of Embodiments and the like.

8. Method for Treating Subject

In the present invention, provided is a method for treating a subject, comprising: a step of applying a first agent (material) composition containing a monovalent metal salt of alginic acid and a coloring component to the subject in a fluid state; a step of contacting a second agent (material) composition containing a cross-linking agent having an action of cross-linking the monovalent metal salt of alginic acid with the first agent (material) composition applied to the subject to gel at least a part of the first agent (material) composition; and a step of evaluating a formation state of a gel coat on a surface of the first agent (material) composition applied to the subject. Details of the first material composition, application thereof to a subject, the second material composition, gelation of the first material composition, evaluation of the formation state of the gel coat, and the like are as described above.

Example 1

Under arthroscopy, an articular cartilage defect portion was filled with a colored sodium alginate solution (2 w/w %). A 100 mM calcium chloride aqueous solution was contacted with the surrounding area including the liquid surface of the sodium alginate solution filling the portion to gel the surface thereof (formation of a gel coat). After about 5 minutes, the surrounding area of the cartilage defect portion including the surface of the gel coat was washed with physiological saline. After washing, when the formation of the gel coat is insufficient, the outflow of the colored alginate in a sol state is observed.

Example 2

Under arthroscopy, an articular cartilage defect portion was filled with a colored sodium alginate solution (2 w/w %). A 100 mM calcium chloride aqueous solution was contacted with the surrounding area including the liquid surface of the sodium alginate solution filling the portion to gel the surface thereof (formation of a gel coat). After about 4 minutes, the surface of the gel coat was touched with the tip of the syringe to confirm the formation of the gel coat. The surface of the gel coat may be touched with a sound. When the formation of the gel coat is insufficient, the outflow of the colored alginate in a sol state is observed.

Example 3

Under arthroscopy, an articular cartilage defect portion was filled with a pH-6.5, purple sodium alginate solution (2 w/w %) colored with the pH-sensitive dye anthocyanin. A 100 mM calcium chloride aqueous solution adjusted to pH 9.0 was contacted with the surrounding area including the liquid surface of the sodium alginate solution filling the portion to gel the surface thereof (formation of a gel coat). The surface of the gel coat in contact with the calcium chloride aqueous solution changes from purple to blue, and the formation state of the gel coat can be evaluated.

Example 4

First material compositions (bioapplicable compositions) can be prepared based on the formulations shown in the tables below. The numerical values in the table mean values in % by mass. The preparation method can be carried out according to Test Example 1. In addition, the first material compositions (bioapplicable compositions) can be prepared by a method generally used in a pharmaceutical product and a medical device. The second material composition can be a 0.1 mol/L calcium chloride solution.

TABLE 3

| Formulation Example 1 | | (Unit: parts by mass) |
|---|---|---|
| First material composition (bioapplicable composition) | Sodium alginate | 2 |
| | Sodium chloride | 0.9 |
| | Blue No. 1 | 0.007 |
| | Water | Balance: |

TABLE 4

| Formulation Example 2 | | (Unit: parts by mass) |
|---|---|---|
| First material composition (bioapplicable composition) | Sodium alginate | 2 |
| | Blue No. 1 | 0.004 |
| | Water | Balance |

TABLE 5

| Formulation Example 3 | | (Unit: parts by mass) |
|---|---|---|
| First material composition | Sodium alginate | 2 |
| | Sodium chloride | 0.9 |

TABLE 5-continued

| Formulation Example 3 | | (Unit: parts by mass) |
|---|---|---|
| (bioappalicable composition) | Green No. 3 | 0.007 |
| | Water | Balance |

Test Example 1

Blue No. 1 (brilliant blue FCF), which is a dye that can be applied to a biological body, was added to a sodium alginate solution (2 w/w %) in such a way as to have a concentration of 0.001 w/w %, 0.004 w/w %, 0.007 w/w %, or 0.01 w/w %, colored, and 5 g of the resulting solution was dispensed into each of 3 glass vials. These were stored in a refrigerator set at 5° C., and sampled after the passage of 1 week, 2 weeks, and 1 month, and each sample was observed to confirm the presence or absence of dye precipitation. In addition, the L*, a*, and b* values of each sample were measured using a spectroscopic color difference meter ("SE-6000," manufactured by Nippon Denshoku Industries Co., Ltd.). The measurement was carried out indoors at normal temperature (15 to 25° C.). The light source was D65/2, and the measurement mode was transmission measurement. Before sample measurement, in the spectroscopic color difference meter, the measured values of the standard white plate (model number SE-38724, manufactured by Nippon Denshoku Co., Ltd.) as the authentic sample were adjusted to L*=100, a*=0, and b*=0.

As a result, as shown in FIG. 2, Blue No. 1 (brilliant blue FCF) exhibited a vivid blue color in the concentration range of 0.001 w/w % to 0.01 w/w %, and no precipitation of the dye was recognized and the color tone was stably maintained, from the time of preparation to one month after refrigerated storage. In addition, it was found that the ranges of color values in the color system of the sodium alginate solution including Blue No. 1 are about 40 to 80 for L* (lightness), about −40 to −5 (green direction) for a*, and about −60 to −20 (blue direction) for b*.

Test Example 2

Blue No. 2 (indigocarmine), which is a dye that can be applied to a biological body, was added to a sodium alginate solution (2 w/w %) in such a way as to have a concentration of 0.004 w/w %, colored, and 2 g of the resulting solution was dispensed into each syringe. The filled syringe was placed in a nest (a container equipped with a grid for syringe fixation) and fixed, and the nest was stored in a refrigerator set at 5° C., and then after one night and after the passage of 19 days, the sample in the syringe was observed to confirm the presence or absence of precipitation of the dye.

As a result, Blue No. 2 (indigocarmine) exhibited a vivid blue color at a concentration of 0.004 w/w %, and no precipitation of the dye was observed after overnight refrigerated storage. However, precipitation of the dye was observed in the observation after the passage of 19 days, and the precipitation disappeared when the syringe was left at room temperature.

From the results of Test Example 1 and Test Example 2, it became clear that Blue No. 1 (brilliant blue FCF) and Blue No. 2 (indigocarmine), which are dyes that can be applied to a biological body, can each impart a vivid blue color tone to the sodium alginate solution. In addition, it became clear that Blue No. 1 (brilliant blue FCF) can impart a more stable blue color tone than Blue No. 2 (indigocarmine).

REFERENCE SIGNS LIST

1 First agent (material) composition
1a The vicinity of the surface of first agent (material) composition
1b Inside of first agent (material) composition other than the vicinity of the surface
2 Cartilage defect portion
3 Second agent (material) composition

The invention claimed is:

1. A method for treating a subject in need thereof, comprising:
    a step of applying a first material composition containing a monovalent metal salt of alginic acid and a coloring component to the subject in a fluid state;
    a step of contacting a second material composition, containing a cross-linking agent having an action of cross-linking the monovalent metal salt of alginic acid, with the first material composition applied to the subject to gel a part of the first material composition;
    a step of evaluating a formation state of a gel coat on a surface of the first material composition applied to the subject;
    wherein the first material composition is in a solution when stored; and
    wherein the coloring component is 0.0005% by mass to 0.05% by mass of Blue No. 1 (brilliant blue FCF).

2. The method according to claim 1, wherein the evaluation of the formation state of the gel coat is an evaluation of the presence or absence of outflow of the first material composition in the fluid state of the first material composition applied to the subject.

3. The method according to claim 1, wherein the evaluation of the formation state of the gel coat is carried out (1) after washing of a surface of the gel coat of the first material composition applied to the subject and/or (2) after pressurization of the surface of the gel coat of the first material composition applied to the subject.

4. The method according to claim 3, wherein the pressurization of the surface of the gel coat is carried out by contacting a device with the surface of the gel coat.

5. The method according to claim 1, wherein the first material composition is applied to at least one body part of the subject selected from the group consisting of bone tissue, cartilage tissue, osteochondral tissue, intervertebral disc tissue, meniscal tissue, and a ligament.

6. The method according to claim 1, wherein color values in the L*a*b* color system measured using a spectroscopic color difference meter (light source: D65/2, measurement mode: transmission measurement) of the first material composition are L*=40 to 80, a*=−40 to 0, and b*=−60 to −20.

7. The method according to claim 1, wherein precipitation of the coloring component does not occur after storage of the first material in a refrigerator at a set temperature of 5° C. for one month.

8. The method according to claim 1, wherein a color difference ΔE value in the L*a*b* color system measured using a spectroscopic color difference meter (light source: D65/2, measurement mode: transmission measurement) of the first material composition, when comparing the composition after storage in a refrigerator at a set temperature of 5° C. for one month with the composition before the storage, is 35 or less.

9. The method according to claim 1, wherein the first material composition can be stored under a condition of 2° C. to 8° C.

10. The method according to claim 1, wherein the first material composition further contains another monovalent metal salt.

11. The method according to claim 1, wherein the first material composition further comprises sodium chloride and can be stored under a condition of 2° C. to 8° C. as a solution.

* * * * *